(12) United States Patent
Schüler

(10) Patent No.: US 8,579,377 B2
(45) Date of Patent: Nov. 12, 2013

(54) DEVICE FOR A MOTOR VEHICLE SEAT

(75) Inventor: Rolf Schüler, Heiligenhaus (DE)

(73) Assignee: KEIPER GmbH & Co. KG, Kaiserslautern (DE)

( * ) Notice: Subject to any disclaimer, the term of this patent is extended or adjusted under 35 U.S.C. 154(b) by 33 days.

(21) Appl. No.: 13/144,179

(22) PCT Filed: Mar. 2, 2010

(86) PCT No.: PCT/EP2010/001269
§ 371 (c)(1),
(2), (4) Date: Jul. 12, 2011

(87) PCT Pub. No.: WO2010/105737
PCT Pub. Date: Sep. 23, 2010

(65) Prior Publication Data
US 2011/0272988 A1 Nov. 10, 2011

(30) Foreign Application Priority Data

Mar. 19, 2009 (DE) .......................... 10 2009 014 376

(51) Int. Cl.
*B60N 2/16* (2006.01)
*B60N 2/20* (2006.01)

(52) U.S. Cl.
USPC ................. 297/362.12; 297/354.12; 297/374; 297/361.1

(58) Field of Classification Search
USPC .................... 297/354.12, 362.12, 374, 361.1; 74/567, 569, 557, 523
See application file for complete search history.

(56) References Cited

U.S. PATENT DOCUMENTS

| 3,972,563 | A | * | 8/1976 | Gustafsson | 297/362 |
| 4,708,392 | A | * | 11/1987 | Werner et al. | 297/362 |
| 4,832,405 | A | * | 5/1989 | Werner et al. | 297/362 |
| 4,874,204 | A | * | 10/1989 | Walk | 297/362 |
| 5,634,689 | A | | 6/1997 | Putsch et al. | |
| 6,918,635 | B2 | | 7/2005 | Finner et al. | |
| 7,188,903 | B2 | | 3/2007 | Finner et al. | |
| 8,052,215 | B2 | * | 11/2011 | Ito | 297/362.11 |
| 8,435,150 | B2 | * | 5/2013 | Schuler et al. | 475/166 |
| 2005/0017561 | A1 | * | 1/2005 | Burmeister et al. | 297/354.12 |
| 2009/0289488 | A1 | * | 11/2009 | Mitsuhashi | 297/354.12 |
| 2011/0037306 | A1 | * | 2/2011 | Sch ler et al. | 297/353 |

FOREIGN PATENT DOCUMENTS

| DE | 44 36 101 A1 | 6/1995 |
| DE | 100 19 854 C2 | 2/2002 |

(Continued)

*Primary Examiner* — David Dunn
*Assistant Examiner* — Timothy J Brindley
(74) *Attorney, Agent, or Firm* — McGlew and Tuttle, P.C.

(57) ABSTRACT

A drive device for a motor vehicle seat (1) has a mount (22), a drive (24) which is mounted to the mount (22), so as to be pivoted about a first axis (A), an output (25) which is mounted to the mount (22), so as to be rotated about a second axis (B), and a transmission. The transmission transmits a driving pivot movement of the drive (24), which moves the drive (24) from an initial position into a deflected position, to the output (25) and causes a rotating movement of the output (25). At least one rolling body (26) is provided as the transmission. The rolling body (26), in the initial position and during the driving pivot movement of the drive (24), is in friction contact both with the drive (24) and simultaneously with the output (25) and rolls along same, and releases during the pivot movement back into the initial position.

20 Claims, 3 Drawing Sheets

(56) References Cited

FOREIGN PATENT DOCUMENTS

| | | |
|---|---|---|
| DE | 100 52 089 C1 | 2/2002 |
| DE | 101 44 840 A1 | 3/2003 |
| DE | 103 40 997 B3 | 1/2005 |
| DE | 103 55 821 B4 | 12/2005 |
| DE | 20 2008009891 U1 | 10/2008 |
| EP | 2 003 357 A2 | 12/2008 |

* cited by examiner

DEVICE FOR A MOTOR VEHICLE SEAT

CROSS REFERENCE TO RELATED APPLICATIONS

This application is a United States National Phase application of International Application PCT/EP2010/001269 and claims the benefit of priority under 35 U.S.C. §119 of German Patent Application DE 10 2009 014 376.9 filed Mar. 19, 2009, the entire contents of which are incorporated herein by reference.

FIELD OF THE INVENTION

The invention relates to a drive device having a frame, a drive input which is mounted on the frame so as to be pivotable about a first axis, a drive output which is mounted on the frame so as to be rotatable about a second axis, and having a transmission means which transmits a driving pivoting movement of the drive input to the drive output and generates a rotational movement of the drive output.

BACKGROUND OF THE INVENTION

Both for vehicle seat height adjusters and also for backrest adjusters, so-called lever drives are known for operating or adjusting the seat function. Such lever drives are bi-directional step switching mechanisms, the actuating angle of which is generally 15 to 30°, and which only transmit the respective actuating direction and are decoupled from the drive output on the return path. Such mechanisms are conventional as load-absorbing systems in height adjusters. In the application as a backrest adjuster, generally the driven backrest fitting, which is designed as a geared fitting, absorbs the usage and crash loads. Known drive devices are disclosed in DE 103 55 821 B4, DE 103 40 997 B3, DE 100 52 089 C1 and DE 100 19 854 C2.

In particular during the actuating of a geared fitting as a backrest adjuster, the idle stroke which is provided and necessary in the geared fitting for the purpose of controlling various components (switching spring, wedges, etc.) is a hindrance in combination with lever drives, because the operating lever travel is often only 15°, while the idle travel of the backrest adjuster is however of a similar order of magnitude. To overcome these circumstances, use has therefore often been made, as one function, of a step-up gearing which expediently interacts directly with the operating lever. The further function of a step switching mechanism is implemented in the abovementioned solutions as a positively locking clutch which is situated spatially behind the gearing and which has toothed bolts and an internal gear toothing. If used for a geared fitting of a backrest adjuster, a further function, a maximum load limitation, is expedient, because such geared fittings are optimized for direct operation by means of a hand-operated wheel, and the maximum structurally admissible torques which can be introduced directly by hand are considerably lower than the torques introduced by means of levers. As a result of these three functions, and the conventionally structurally very different implementation of the respective individual functions in the form of components, the abovementioned overall solutions are in effect constructed as individual functional assemblies connected one behind the other in series. This ultimately results in a multiplicity of individual components, corresponding production costs and a considerable installation space requirement.

SUMMARY OF THE INVENTION

The invention is based on an object of improving a drive device of the type specified in the introduction, in particular with regard to the number of components, the production costs and the installation space requirement. This object is achieved according to the invention with a drive device comprising a frame, a drive input mounted on the frame so as to be pivotable about a first axis, a drive output, which is mounted on the frame so as to be rotatable about a second axis, and a transmission means. The transmission means transmits a driving pivoting movement of the drive input, which causes the drive input to be moved from an initial position into a deflected position, to the drive output and generates a rotational movement of the drive output. The transmission means comprises at least one first rolling body which, in the initial position and during the driving pivoting movement of the drive input, is in frictional contact with and rolls on both the drive input and also at the same time the drive output, and which disengages during the pivoting movement back into the initial position.

The drive device according to the invention is designed as a step switching mechanism which utilizes the operating principle of a (noiseless) eccentric friction wheel transmission. As rolling bodies, use may for example be made of (cylindrical) rollers or balls. The conversion of the driving pivoting movement of the drive input into a rotational movement of the drive output takes place by means of rolling of the (first) rolling body on the drive input and drive output on account of the simultaneous frictional contact when the drive input moves from the initial position into the deflected position. During the return into the initial position, the first rolling body disengages such that no movement is transmitted to the drive output. Any drive-output-side torques which could turn the drive output backward may be blocked by means of a suitable drive-output-side blocking means, for example a self-locking geared fitting.

For the function of a bi-directional step switching mechanism, a further rolling body is provided. While the first rolling body transmits the driving pivoting movement, the second rolling body is driven along by a driver of the drive input. Here, the second rolling body is preferably pressed against the drive input by means of a (preloaded) elastic element, in particular a spring, such that there is no frictional contact with the drive output. If the drive input returns into the initial position, with the first rolling body being disengaged, the second rolling body also does not drive on account of the lack of frictional contact. In contrast, if the drive output is deflected in the other direction, the second rolling body transmits the driving pivoting movement while the first rolling body—without frictional contact with the drive output—is driven along by the drive input.

For the function of a step-up gear ratio, those running surfaces which are in frictional contact with the rolling bodies and which are provided on the drive input and drive output and which run concentrically with respect to the first and second axes have different radii of curvature with respect to the axes. The ratio of the radii of curvature corresponds to the gear ratio.

For the function of a maximum load limitation, a stop is provided on the frame. The first rolling body (that is to say the central point thereof which defines the rotational axis) normally remains in its position during the driving pivoting movement of the drive input, and is forced out of its position only in the event of excessively high loads which for example cause elastic deformations. The stop on the frame prevents a further such movement of the first rolling body and reduces the frictional contact, in the extreme case to the point that slipping occurs.

In the vehicle seat, the drive device, which may be of non-load-absorbing design, may be used to drive a geared fitting which is for example of load-absorbing design. Such a geared fitting serves for example as a backrest adjuster or drives a height adjuster or inclination adjuster.

The invention will be explained in more detail below on the basis of an exemplary embodiment illustrated in the drawing The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
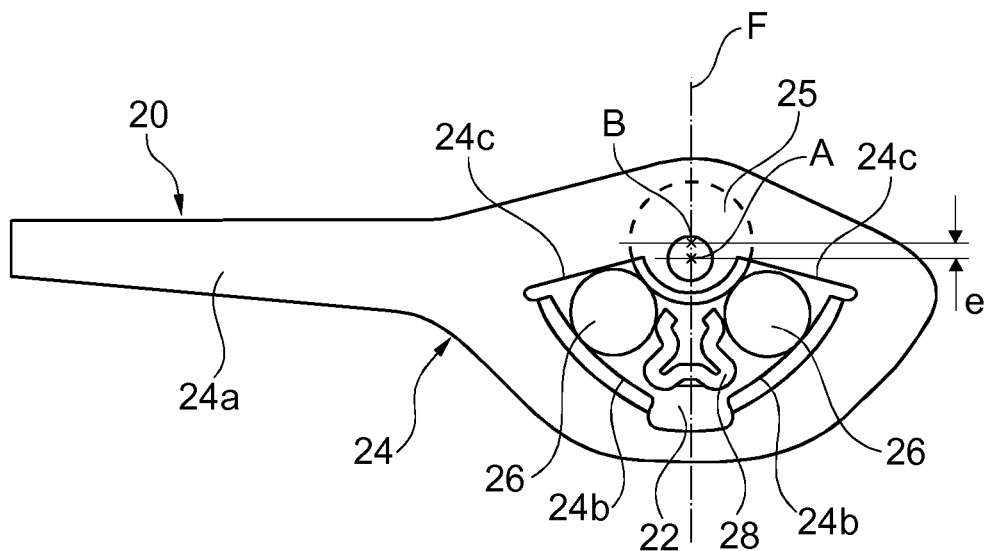
FIG. 1 is a partially schematic illustration of the exemplary embodiment in the initial position.

Referring to the drawings in particular, a vehicle seat 1 for a motor vehicle is fastened by means of its base 3, for example two seat rail pairs, to the vehicle floor of the motor vehicle. A height adjuster 5 of the vehicle seat 1 has, on both sides of the vehicle, in each case one four bar linkage which is formed from the base 3, a front link 7, a rear link 9 and a seat framework 10, which are connected to one another in each case by means of joints. The seat framework 10 bears a seat cushion 12 and, in the present case, also a backrest 14. By means of the height adjuster 5, the height of the seat cushion 12—and in the present case simultaneously also that of the backrest 14—of the vehicle seat 1 above the vehicle floor (and therefore above the base 3) can be adjusted.

To drive and to lock the height adjuster 5, at least one geared fitting 16 is provided which, on one side of the vehicle seat, acts between two gear members of the four bar mechanism provided there, in the present case between the seat framework 10 and the rear link 9. The geared fitting 16 is of load-absorbing design, that is to say it lies in the force flow and can transmit crash forces. The geared fitting 16 is preferably a self-locking eccentric epicyclic gearing whose two fitting parts—assigned to in each case one gear member—perform a relative rotational movement with superposed tumbling movement. The internal design of the geared fitting 16 is disclosed for example in DE 44 36 101 A1 or DE 101 44 840 A1, the contents of disclosure of which document in this regard are incorporated by express reference. Corresponding or related U.S. Pat. Nos. 5,634,689; 6,918,635 and U.S. Pat. No. 7,188,903 are hereby incorporated by reference in their entirety. If the geared fitting 16 is driven, it pivots the two associated gear members relative to one another. A geared fitting 16 of the type may be provided on each of the two sides of the vehicle seat, with the two geared fittings 16 being connected to one another (in a synchronized fashion) by way of a geared connection.

The geared fitting 16 and therefore the height adjuster 5 is driven manually by a drive device 20. The non-load-absorbing drive device 20 drives the load-absorbing geared fitting 16 for example by means of a shaft 21. In the case of two geared fittings 16, the shaft 21 produces the geared connection of the two geared fittings 16, and drives the geared fittings synchronously.

The drive device 20 comprises a frame 22, a drive input 24 which is mounted on the frame 22 so as to be pivotable about a first axis A, a drive output 25 which is mounted on the frame 22 so as to be rotatable about a second axis B, two rolling bodies 26, and a spring 28. The frame 22 forms the stationary reference system of the drive device 20, and in the exemplary embodiment, is fastened to the seat framework 10. The two axes A and B are arranged so as to be offset relative to one another in parallel by a (non-zero) eccentricity e, whereby a plane F is defined which contains the two axes A and B. In FIG. 1, the offset (and therefore the line of intersection of the plane F with the drawing plane) in the vertical direction is illustrated.

The drive input 24 has an integrally formed lever 24a for manually pivoting the drive input 24, and has two circular-arc-shaped drive input segments 24b. The drive input segments 24b extend in the present case in each case over an angle of 60°, with other angles also being possible. The drive input segments 24b may delimit a window in the drive input 24 and/or may protrude axially out of the pivot plane of the lever 24a. The drive input segments 24b define in each case cylindrical, concave running surfaces, which are concentric with respect to the first axis A, for the rolling bodies 26. On the two sides of the rolling bodies 26 facing away from the plane F, the drive input 24 has in each case one driver 24c which, in the present case, is designed as a surface which runs radially (with respect to the first axis A). Correspondingly to the drive input segments 24b, the drivers 24c may delimit the window in the drive input 24 and/or project axially out of the pivot plane of the lever 24a. The drive input 24 is mounted on the frame 22 preferably by means of a bearing journal. For special situations, it is possible for the lever 24a not to be an integral constituent part of the drive input 24 but rather to be formed separately and to act via an interposed gearing on the part of the drive input 24 having the drive input segments.

The drive output 25, as it rotates, drives the shaft 21 which drives the geared fitting 16 and which may be formed in one piece with the drive output 25 or connected thereto for conjoint rotation therewith. The drive output 25 defines a cylindrical, convex running surface, which is concentric with respect to the second axis B, for the rolling bodies 26. For this purpose, the drive output 25 may be formed as a cylindrical journal which simultaneously serves for mounting on the frame 22. In the present case, the rolling bodies 26 are formed as cylindrical rollers, though may also be formed as balls. Each rolling body 26 is assigned precisely one drive input segment 24b. The rolling bodies 26 are arranged radially between the drive input segments 24b and the drive output 25 and (in the initial position) are in each case in frictional contact with these. On account of the eccentricity e, the intermediate space between the drive input segments 24b and the drive output 25 is curved in a wedge shape in the manner of a crescent, as a result of which for each rolling body 26 a wedge gap is defined which tapers with increasing distance from the plane F. The spring 28 is fastened to the frame 22 and preloaded in order to load the two rolling bodies 26. In the present case, the spring 28, which is formed symmetrically with respect to the plane F, has two limbs, each of which can act on in each case precisely one rolling body 26.

Figure 5:
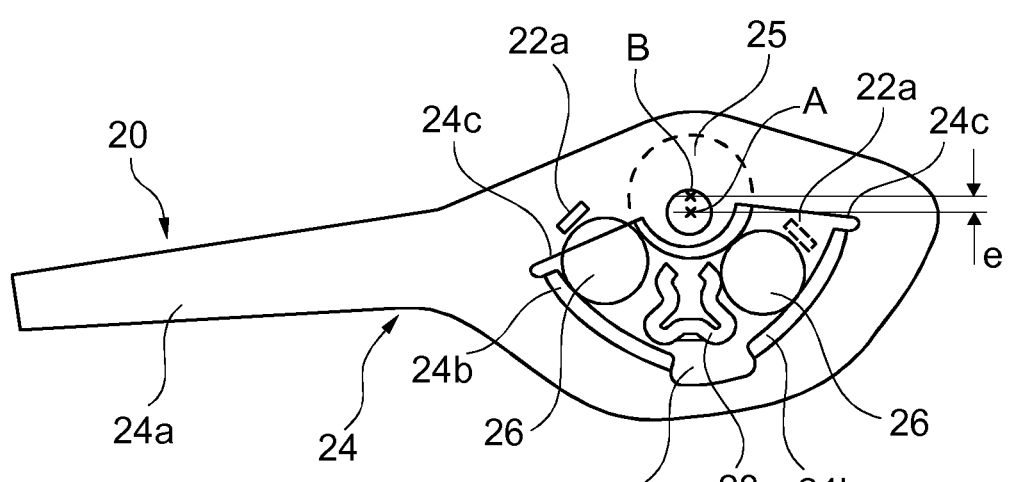
FIG. 5 is a partially schematic illustration of the exemplary embodiment during pivoting movement of the drive input.

In the initial position of the drive device, as illustrated in FIG. 1, the two rolling bodies 26 are arranged symmetrically with respect to the plane F, are acted on by in each case one limb of the preloaded spring 28 (and pushed apart), and are in direct frictional contact both with the drive input segment 24b assigned thereto in each case and also with the drive output 25. This geometric arrangement forms a friction wheel transmission which, during a driving pivoting movement of the drive input 24, transforms the movement in the ratio of the (larger) radius of the drive input segment 24b to the (smaller) radius of the drive output 25, and consequently steps up the movement. The rolling bodies 26 serve as transmission means for transforming the driving pivoting movement of the drive input 24 into a rotational movement of the drive output 25, by virtue of the rolling bodies in each case being able to roll on the drive output. Here, depending on the drive input direction (clockwise-counterclockwise), one rolling body 26 is pushed into the curved wedge gap and the contact forces are generated proportionally with respect to the drive output torque, while the other rolling body 26 is forced out of the wedge gap by the movement alone, and is therefore disengaged in this direction. FIG. 5 shows the simultaneous frictional contact between one rolling body 26 and the drive input 24 during the driving pivoting movement of the drive input 24 and the other rolling body 26 pressed out of the wedge gap. Without further measures, any movement of the drive input 24 would be transmitted, with a step-up ratio, to the drive output 25, in each case alternately by one or other of the rolling bodies 26.

Figure 2:
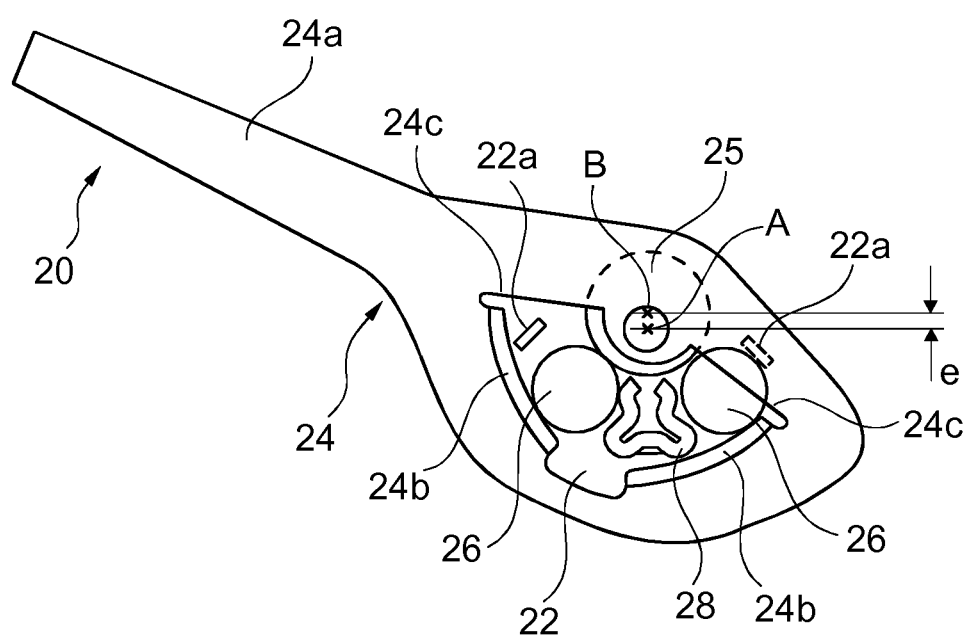
FIG. 2 is a partially schematic illustration of the exemplary embodiment in a deflected position.
Figure 3:
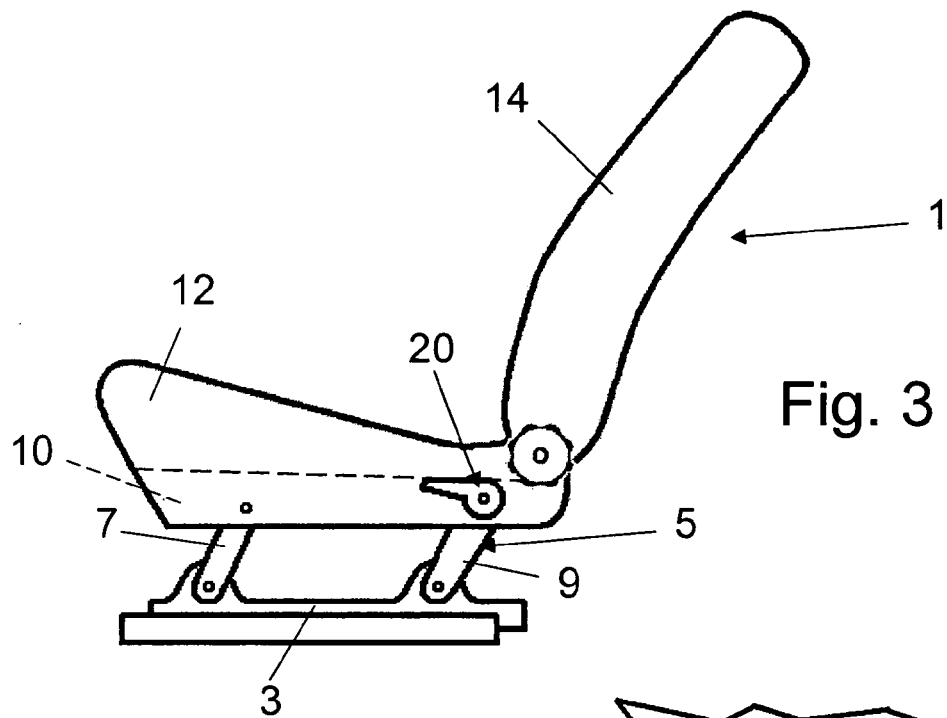
FIG. 3 is a schematic side view of the vehicle seat.
Figure 4:
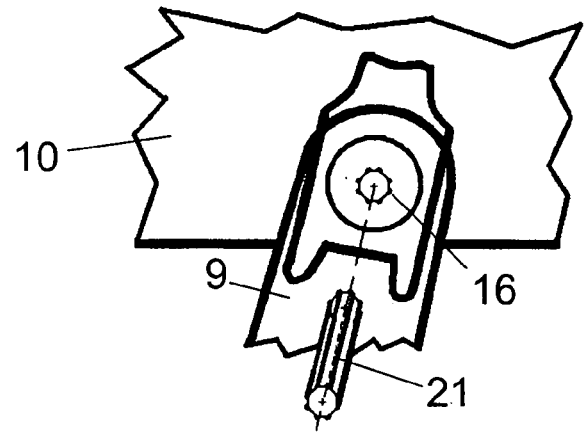
FIG. 4 is a perspective view of the drive device and of the driven geared fitting.
Figure 4:
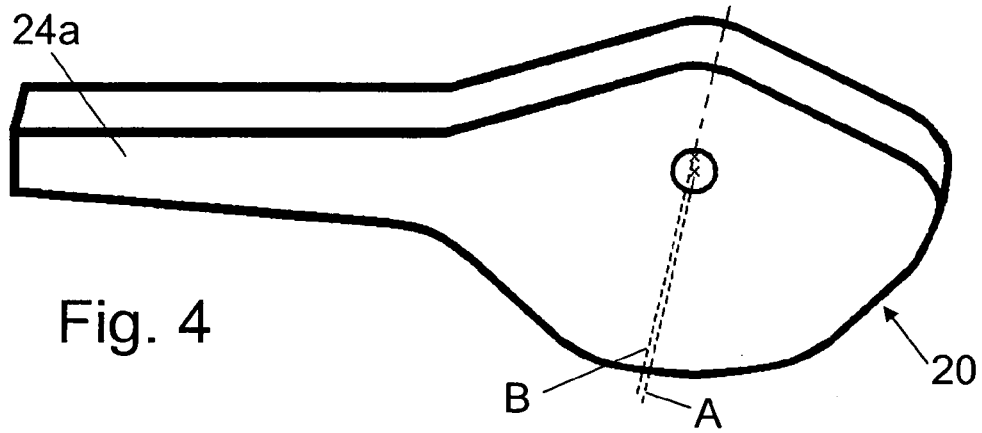

The complete function as a step switching mechanism is now realized in an extremely simple manner in that the non-driving rolling body 26 (that is to say the rolling body which has been forced out of the wedge gap) is completely driven along by the driver 24c, which is assigned thereto, in the drive 24, and is thereby completely removed from the region of possible frictional contact. FIG. 2 shows such a fully (clockwise) deflected position of the drive input 24 and of the rolling body 26.

In the illustrated situation, the left-hand, first rolling body 26 has transmitted the movement, and here—under normal usage loads—had remained substantially positionally fixed in its initial position, and merely rotated about its own axis there. In contrast, the right-hand, second rolling body 26 has been acted on by the spring 28 counter to the direction of the driving pivoting movement of the drive input 24 and pressed against the right-hand drive input segment 24b, but is no longer in contact with the drive output 25. If the clockwise pivoting movement is now ended, then the drive input 24 is placed back into its initial position by the spring 28 via the right-hand rolling body 26 and the right-hand driver 24c. Here, the left-hand rolling body 26 is disengaged on account of the changed movement direction. Since the right-hand rolling body 26 first makes contact with the drive output 25 again in the initial position, the drive output 25 is specifically not driven during the return pivoting movement (but rather is blocked by the geared fitting 16). During a driving pivoting movement counterclockwise, the rollers of the left-hand and right-hand drive input segments 24b, the drivers 24c and rolling bodies 26 are reversed in relation to FIG. 2. Both the function of a bi-directional step switching mechanism and also that of a simultaneous step-up gear ratio are therefore realized.

As a third function, it is possible for a maximum load limitation to be realized without additional components. For this purpose, in each case one stop 22a for each rolling body 26 is provided at a suitable location on the frame 22, with which stop 22a the rolling body 26 makes contact during the driving pivoting movement of the drive input 24, which prevents a further movement of the driving rolling body 26. All the geometries involved will elastically deform under loading, in particular, with corresponding design, the contact contour of the drive input 24. The deformation leads to an enlargement of the effective radius of the drive input contour and therefore to an "expansion" of the wedge gap between the drive input 24 and drive output 25, with the direct result that the driving rolling body 26, under high loading (that is to say loading greater than the normal usage loads) does not remain exactly at its initial position and merely rotate about its axis there, but rather, as a function of the loading, the central point of the rolling body 26 travels further into the wedge gap which increases in size on account of the deformation. The movement of the central point of the driving rolling body 26 is utilized in order, for a definable loading value, to generate additional contact between the rolling body 26 and the stop 22a on the frame 22, as a result of which at the same the contact forces of the rolling body 26 with respect to the drive input 24 and drive output 25 are reduced until ultimately the rolling body 26 slips at a definable loading.

With the described design of the drive device 20, the three conventional basic functions of a step switching mechanism can be realized using six components. Different gear ratios, lever drive input angles, lever restoring forces and maximum torques may be generated by means of simple variation of the geometries of the drive input 24, rolling bodies 26, drive output 25, spring 28 and frame 22. Also, the effect of a "ratchet noise" during adjustment, which is desirable in some applications, may if required be generated by means of a toothed region of the drive output 24 in a further plane and a further spring arm, which bears against the toothing, of the existing spring 28.

Under certain circumstances, it may be desirable for the gear ratio between the drive input 24 and drive output 25 not to be a step-up gear ratio as described previously, but rather to be a step-down gear ratio. For this purpose, too, the described operating principle may be utilized simply by reversing the ratios of the corresponding geometries and radii of the drive input 24 with respect to the drive output 25. The drive input 24, which is then situated at the inside, consequently has two relatively small drive input segments 24b, while the drive output 25 is realized as a bell which engages around at the outside.

The geared fitting 16 which is used was developed originally for the adjustment of the backrest 14. The non-load-absorbing drive device 20 according to the invention may also be used for a backrest adjuster, and there, drive a load-absorbing geared fitting 16. Here, a geared fitting 16 of the type may also be provided on each of the two sides of the vehicle seat, with the two geared fittings 16 being connected to one another by way of a geared connection and being driven synchronously by the drive device 20, for example by means of a shaft 21. A corresponding situation applies if the drive device 20 is to be used for an inclination adjuster, which likewise has at least one geared fitting 16.

While specific embodiments of the invention have been described in detail to illustrate the application of the principles of the invention, it will be understood that the invention may be embodied otherwise without departing from such principles.

The invention claimed is:

1. A drive device for a vehicle seat, the drive device comprising:
 a frame;
 a drive input mounted on the frame so as to be pivotable about a first axis;
 a drive output mounted on the frame so as to be rotatable about a second axis; and
 a transmission means for transmitting a driving pivoting movement of the drive input, which causes the drive input to be moved from an initial position into a deflected position, to the drive output and for generating a rotational movement of the drive output, the transmission means comprising a first rolling body which, in an initial position and during the driving pivoting movement of the drive input, is in frictional contact with and rolls on both the drive input and also at the same time the drive output, and which disengages from said rolling body during pivoting movement back into the initial position, said transmission means further comprising a second rolling body which, in the initial position, is in frictional contact both with the drive input and simultaneously also with the drive output, and which, during the driving pivoting movement of the drive input, is driven along, with the simultaneous frictional contact being eliminated, by a driver of the drive input.

2. The drive device as claimed in claim 1, wherein the drive input has a drive input segment at which the frictional contact between the rolling body and the drive input takes place.

3. The drive device as claimed in claim 1, further comprising a spring or some other elastic element fastened to the frame, the spring or element acting on the second rolling body, which second rolling body is driven along by the driver, counter to a direction of the driving pivoting movement of the drive input.

4. The drive device as claimed in claim 3, wherein the spring or other elastic element holds the second rolling body, which is driven along by the driver, at a distance from the drive output and in contact with a drive input segment of the drive input.

5. The drive device as claimed in claim 1, wherein the first axis and the second axis are offset relative to one another in parallel by an eccentricity distance, whereby a plane is defined which contains the two axes.

6. The drive device as claimed in claim 1, wherein:
in the initial position, the drive input and the drive output are of a mirror-symmetrical design in regions which interact with the first rolling body and the second rolling body; and
in the initial position, the rolling bodies are arranged symmetrically with respect to a plane which contains the first axis and the second axis.

7. The drive device as claimed in claim 1, wherein running surfaces on the drive input and drive output which are in frictional contact with the first rolling body and said second rolling body have different radii of curvature with respect to the axes.

8. The drive device as claimed in claim 1, wherein the drive input and the drive output have regions which interact with the first rolling body and the second rolling body and define for each provided rolling body a wedge gap, into which the rolling body is pressed during the driving pivoting movement and out of which the rolling body is pushed during disengagement.

9. The drive device as claimed in claim 1, wherein the frame has at least one stop with which the first rolling body comes into contact during the driving pivoting movement of the drive in the event of a high loading in relation to normal usage loads, which prevents a further movement of the first rolling body and thereby limits the maximum torque which can be transmitted to the drive output.

10. A motor vehicle seat comprising:
a geared fitting provided in one or more of a height adjuster, an inclination adjuster and a backrest adjuster of the vehicle seat; and
a drive device connected to the geared fitting, the drive device comprising:
a frame;
a drive input mounted on the frame so as to be pivotable about a first axis;
a drive output mounted on the frame so as to be rotatable about a second axis; and
a transmission transmitting a driving pivoting movement of the drive input, from an initial position into a deflected position, to the drive output and generating a rotational movement of the drive output, the transmission comprising a first rolling body in frictional contact with and rolling on both the drive input and the drive output, and which disengages from said rolling body during pivoting movement back into the initial position, said transmission further comprising a second rolling body, which, in the initial position, is in frictional contact both with the drive input and the drive output, and during the driving pivoting movement of a driver of the drive input, said second rolling body is driven along by the drive input and frictional contact of said second rolling body is eliminated.

11. The vehicle seat as claimed in claim 10, further comprising a spring or other elastic element fastened to the frame, the spring or other element acting on the second rolling body, which second rolling body is driven along by the driver counter to a direction of the driving pivoting movement of the drive input.

12. The vehicle seat as claimed in claim 11, wherein the spring or other elastic element holds the second rolling body, which is driven along by the driver, at a distance from the drive output and in contact with a drive input segment of the drive input.

13. The vehicle seat as claimed in claim 10, wherein the first axis and the second axis are offset relative to one another in parallel by an eccentricity distance, whereby a plane is defined which contains the two axes.

14. The vehicle seat as claimed in claim 10, wherein:
in the initial position, the drive input and the drive output are of a mirror-symmetrical design in regions which interact with the first rolling body and the second rolling body; and
in the initial position, the rolling bodies are arranged symmetrically with respect to a plane which contains the first axis and the second axis.

15. The vehicle seat as claimed in claim 14, wherein running surfaces on the drive input and drive output which are in frictional contact with the rolling bodies have different radii of curvature with respect to the first axis and the second axis.

16. The vehicle seat as claimed in claim 10, wherein the drive input and the drive output have regions which interact with the first rolling body and the second rolling body and define for each provided rolling body a wedge gap, into which the rolling body is pressed during the driving pivoting movement and out of which the rolling body is pushed during pivoting movement back into the initial position.

17. The vehicle seat as claimed in claim 10, wherein the frame has at least one stop with which the first rolling body comes into contact during the driving pivoting movement of the drive in the event of a high loading in relation to normal usage loads, which prevents a further movement of the first rolling body and thereby limits the maximum torque which can be transmitted to the drive output.

18. A drive device for a vehicle seat, the drive device comprising:
a frame;
a drive input mounted on the frame so as to be pivotable about a first axis;

a drive output mounted on the frame so as to be rotatable about a second axis; and a transmission means for transmitting a driving pivoting movement of the drive input, which causes the drive input to be moved from an initial position into a deflected position, to the drive output and for generating a rotational movement of the drive output, the transmission means comprising a rolling body which, in an initial position and during the driving pivoting movement of the drive input, is in frictional contact with and rolls, relative to said drive input and said drive output, on both the drive input and also at the same time the drive output, and which disengages from said rolling body during pivoting movement back into the initial position.

19. The drive device as claimed in claim 18, wherein said transmission means further comprises another rolling body which, in the initial position, is in frictional contact both with the drive input and simultaneously also with the drive output, and which, during the driving pivoting movement of the drive input, is driven along, with the simultaneous frictional contact being eliminated, by a driver of the drive input, said rolling body and said another rolling body comprising a cylindrical roller ball body.

20. The drive device as claimed in claim 19, further comprising a spring or other elastic element fastened to the frame, the spring or other element acting on the another rolling body, wherein said second rolling body is driven along by the driver counter to a direction of the driving pivoting movement of the drive input, said drive input having a drive input segment at which the frictional contact between the drive input and the first rolling body takes place.

* * * * *